US012684507B2

(12) United States Patent
Cheng

(10) Patent No.: US 12,684,507 B2
(45) Date of Patent: Jul. 14, 2026

(54) MECHANISM FOR FAST AND HIGHLY SCALABLE DIRECTIONAL MOBILE ADHOC NETWORK (D-MANET) TIME SYNCHRONIZATION AND FORMATION

(71) Applicant: Leidos, Inc., Reston, VA (US)

(72) Inventor: Ana M. Cheng, Odessa, FL (US)

(73) Assignee: Leidos, Inc., Reston, VA (US)

( * ) Notice: Subject to any disclaimer, the term of this patent is extended or adjusted under 35 U.S.C. 154(b) by 350 days.

(21) Appl. No.: 18/597,300

(22) Filed: Mar. 6, 2024

(65) Prior Publication Data

US 2024/0323875 A1 Sep. 26, 2024

Related U.S. Application Data

(60) Provisional application No. 63/491,395, filed on Mar. 21, 2023.

(51) Int. Cl.
| | |
|---|---|
| *H04L 12/00* | (2006.01) |
| *H04J 3/06* | (2006.01) |
| *H04L 5/00* | (2006.01) |
| *H04W 56/00* | (2009.01) |
| *H04W 76/10* | (2018.01) |

(52) U.S. Cl.
CPC ....... *H04W 56/0015* (2013.01); *H04J 3/0658* (2013.01); *H04L 5/0053* (2013.01); *H04W 76/10* (2018.02)

(58) Field of Classification Search
CPC . H04W 56/0015; H04W 76/10; H04J 3/0658; H04L 5/0053
USPC .......................................................... 370/503
See application file for complete search history.

(56) References Cited

U.S. PATENT DOCUMENTS

| | | | |
|---|---|---|---|
| 5,606,551 A | 2/1997 | Kartalopoulos |
| 6,640,087 B2 | 10/2003 | Reed |
| 6,904,279 B1 | 6/2005 | Lilja |
| (Continued) | | |

FOREIGN PATENT DOCUMENTS

| | | |
|---|---|---|
| CN | 104661282 B | 6/2018 |
| CN | 105610606 B | 6/2018 |
| (Continued) | | |

OTHER PUBLICATIONS

Benveniste, et al., Performance Evaluation of a Medium Access Control Protocol for IEEE 802.11s Mesh Networks, pp. 1-5, Jan. 1, 2006.

(Continued)

*Primary Examiner* — Frantz Coby
(74) *Attorney, Agent, or Firm* — Dawn-Marie Bey; Bey & Cotropia PLLC

(57) ABSTRACT

A process described herein facilitates linking nodes to form a directional network in GPS-denied circumstances. Synchronized nodes wirelessly transmit link establishment requests on pseudo-randomly selected time slots within sub-templates, receive link establishment responses from unsynchronized node on the same time slot in future sub-templates, and transmit link establishment acknowledgements on the same time slot to the unsynchronized node. Upon receipt of the link establishment acknowledgement, the unsynchronized node calculates a clock value to match a clock value of the synchronized node and establishes a link therewith.

14 Claims, 11 Drawing Sheets

(56) References Cited

U.S. PATENT DOCUMENTS

| | | | |
|---|---|---|---|
| 6,963,747 B1 | 11/2005 | Elliott | |
| 6,965,568 B1 | 11/2005 | Larsen | |
| 6,989,797 B2 | 1/2006 | Gothard | |
| 7,224,685 B2 | 5/2007 | Proctor, Jr. | |
| 7,333,458 B2 | 2/2008 | Cain | |
| 7,420,944 B2 | 9/2008 | Norris | |
| 7,502,354 B1 | 3/2009 | Maufer | |
| 7,505,450 B2 | 3/2009 | Castagnoli | |
| 7,522,540 B1 | 4/2009 | Maufer | |
| 7,580,730 B2 | 8/2009 | Tegreene | |
| 7,609,648 B2 | 10/2009 | Hoffmann | |
| 7,719,972 B2 | 5/2010 | Yuan | |
| 7,821,994 B2 | 10/2010 | Sherman | |
| 7,899,027 B2 | 3/2011 | Castagnoli | |
| 8,045,505 B2 * | 10/2011 | Cheng | H04L 41/12 |
| | | | 370/254 |
| 8,111,647 B2 | 2/2012 | Shao | |
| 8,189,555 B2 | 5/2012 | Wu | |
| 8,199,635 B2 | 6/2012 | Taylor | |
| 8,379,664 B2 | 2/2013 | Cordeiro | |
| 8,422,473 B2 | 4/2013 | Cheng | |
| 8,599,822 B2 | 12/2013 | Castagnoli | |
| 8,611,940 B2 | 12/2013 | Jain | |
| 8,945,505 B2 | 2/2015 | Yang | |
| 9,062,992 B2 | 6/2015 | Jung | |
| 9,247,580 B2 | 1/2016 | Cheng | |
| 9,386,578 B2 | 7/2016 | Holtzman | |
| 9,876,686 B2 | 1/2018 | Cheng | |
| 10,051,548 B1 | 8/2018 | Reeves | |
| 10,270,665 B2 | 4/2019 | Cheng | |
| 10,542,408 B2 | 1/2020 | So | |
| 10,764,853 B2 * | 9/2020 | Ji | H04W 56/00 |
| 12,047,894 B2 * | 7/2024 | Newman | H04W 56/0075 |
| 2001/0046872 A1 | 11/2001 | Masuda | |
| 2002/0181427 A1 | 12/2002 | Sparr | |
| 2003/0109285 A1 | 6/2003 | Reed | |
| 2003/0235175 A1 | 12/2003 | Naghian | |
| 2004/0047293 A1 | 3/2004 | Arrakoski | |
| 2004/0259597 A1 | 12/2004 | Gothard | |
| 2005/0030968 A1 | 2/2005 | Rich | |
| 2005/0068902 A1 | 3/2005 | Rath | |
| 2005/0201340 A1 | 9/2005 | Wang | |
| 2005/0282494 A1 | 12/2005 | Kossi | |
| 2006/0013178 A1 | 1/2006 | Seguin | |
| 2006/0052125 A1 | 3/2006 | Falck | |
| 2006/0068822 A1 | 3/2006 | Kalhan | |
| 2006/0072535 A1 | 4/2006 | Ito | |
| 2006/0077985 A1 | 4/2006 | Erwin | |
| 2006/0203784 A1 | 9/2006 | Cromer | |
| 2006/0215581 A1 | 9/2006 | Castagnoli | |
| 2006/0215582 A1 | 9/2006 | Castagnoli | |
| 2006/0215583 A1 | 9/2006 | Castagnoli | |
| 2006/0215624 A1 | 9/2006 | Adya | |
| 2006/0251119 A1 | 11/2006 | Ramesh | |
| 2006/0256737 A1 | 11/2006 | Choi | |
| 2007/0087758 A1 | 4/2007 | Norris | |
| 2007/0206528 A1 | 9/2007 | Walton | |
| 2008/0069029 A1 | 3/2008 | Chow | |
| 2008/0151833 A1 | 6/2008 | Natarajan | |
| 2008/0171519 A1 | 7/2008 | Tegreene | |
| 2008/0198829 A1 * | 8/2008 | Cheng | H04W 72/044 |
| | | | 370/342 |
| 2010/0039933 A1 | 2/2010 | Taylor | |
| 2011/0287796 A1 | 11/2011 | Jain | |
| 2012/0307726 A1 * | 12/2012 | Pi | H04J 11/0069 |
| | | | 370/328 |
| 2016/0330571 A1 | 11/2016 | Tegreene | |
| 2017/0141952 A1 | 5/2017 | Inohiza | |
| 2018/0159742 A1 | 6/2018 | Cheng | |
| 2019/0174440 A1 * | 6/2019 | Kwak | H04W 52/0216 |
| 2022/0353866 A1 | 11/2022 | Rahman | |
| 2024/0236780 A1 * | 7/2024 | Paz | H04W 36/0072 |
| 2025/0193821 A1 * | 6/2025 | Yue | H04W 56/0045 |

FOREIGN PATENT DOCUMENTS

| | | | | | |
|---|---|---|---|---|---|
| CN | 107925924 B | | 4/2021 | | |
| CN | 107742924 B | | 11/2023 | | |
| DE | 10213213 A1 | | 10/2003 | | |
| EP | 2716082 A4 | | 3/2015 | | |
| EP | 2959726 B1 | | 7/2019 | | |
| FI | 107687 B | | 9/2001 | | |
| GB | 2630502 A | * | 11/2024 | | H04W 56/0045 |
| JP | 2004289836 A | | 10/2004 | | |
| JP | 4289855 B2 | | 7/2009 | | |
| JP | 5820471 B2 | | 11/2015 | | |
| JP | 6684079 B2 | | 4/2020 | | |
| WO | 2001028132 A1 | | 4/2001 | | |

OTHER PUBLICATIONS

Macker, et al., "Mobile Ad Hock Networking and the IETF", Mobile Computing and Communications Review, vol. 1, No. 1, pp. 9-14, Jan. 1998.

Wei, et al., "Interference-Aware IEEE 802.16 WiMax Mesh Networks", IEEE Vehicular Technology Conference (VTC 2005 Spring), Stockholm, Sweden, May 29-Jun. 1, 2005, pp. 1-5.

Zhu, et al. "A New Protocol for Scheduling TDMA Transmissions i Mobile Ad Hoc Networks", Institute for Systems Research, University of Maryland, pp. 1-11, 2001.

Zhu, et al., "A Five-Phase Reservation Protocol (FPRP) for Mobile Ad Hoc Networks", 1998, IEEE, pp. 1-10.

Zhu, et al., "An Evolutionary-TDMA Scheduling Protocol for Mobile Ad Hoc Networks", Institute for Systems Research, University of Maryland, pp. 1-11, 1998.

* cited by examiner

FIGURE 1 – Prior Art

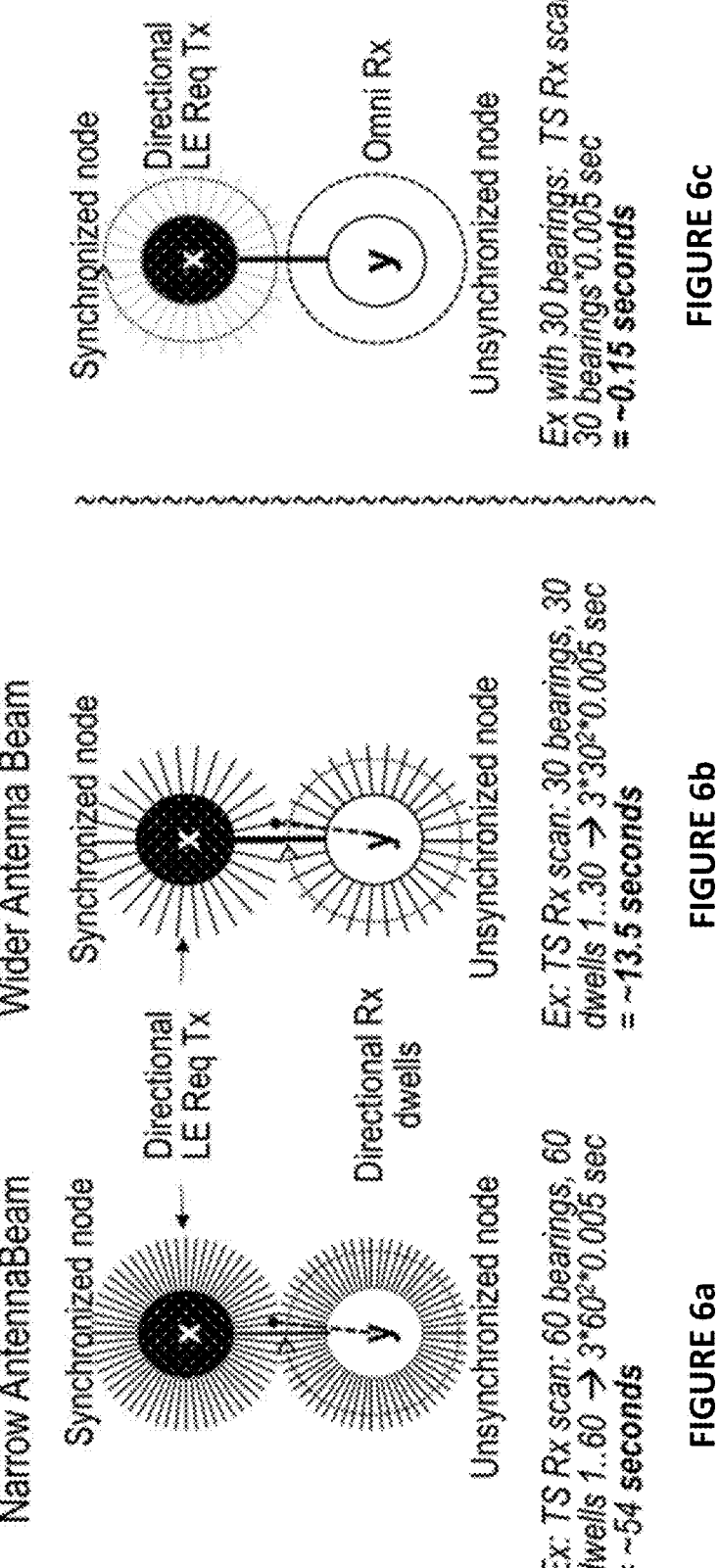

Narrow Antenna Beam

Synchronized node

Directional
LE Req Tx

Directional Rx
dwells

Unsynchronized node

*Ex: TS Rx scan: 60 bearings, 60
dwells 1..60 → 3*60*0.005 sec
= ~54 seconds*

FIGURE 6a

Wider Antenna Beam

Synchronized node

Unsynchronized node

*Ex: TS Rx scan: 30 bearings, 30
dwells 1..30 → 3*30*0.005 sec
= ~13.5 seconds*

FIGURE 6b

Synchronized node

Directional
LE Req Tx

Omni Rx

Unsynchronized node

*Ex with 30 bearings:  TS Rx scan:
30 bearings*0.005 sec
= ~0.15 seconds*

FIGURE 6c

Figure 7A:
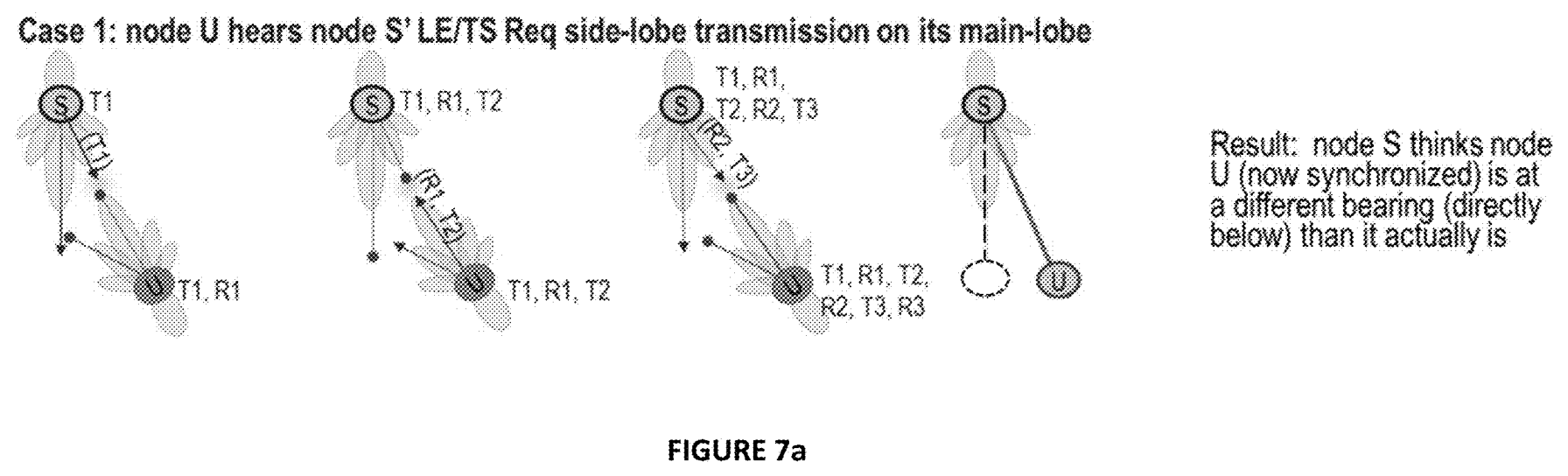

Result: node S thinks node U (now synchronized) is at a different bearing (directly below) than it actually is Case 1: node U hears node S' LE/TS Req side-lobe transmission on its main-lobe

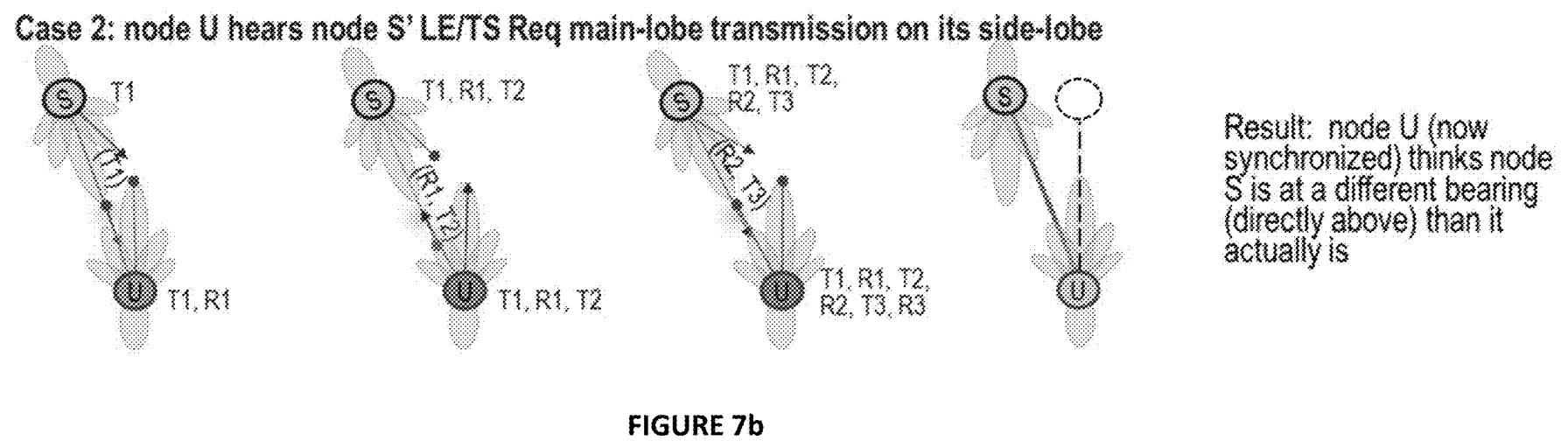

Result: node U (now synchronized) thinks node S is at a different bearing (directly above) than it actually is Case 2: node U hears node S' LE/TS Req main-lobe transmission on its side-lobe

FIGURE 7b

Result: node S thinks node U (now synchronized) is at a different bearing (directly below) than it actually is; U thinks S is at a different bearing (directly above) than it actually is
Case 3: node U hears node S' LE/TS Req side-lobe transmission on its side-lobe
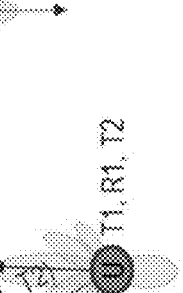
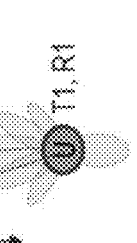
FIGURE 7c

MECHANISM FOR FAST AND HIGHLY SCALABLE DIRECTIONAL MOBILE ADHOC NETWORK (D-MANET) TIME SYNCHRONIZATION AND FORMATION

CROSS-REFERENCE TO RELATED APPLICATIONS

The present application claims the benefit of priority to U.S. Provisional Patent Application No. 63/491,395 entitled MECHANISM FOR FAST AND HIGHLY SCALABLE DIRECTIONAL MOBILE ADHOC NETWORK (D-MANET) TIME SYNCHRONIZATION AND FORMATION, filed Mar. 21, 2023, which is incorporated herein by reference in its entirety.

Additionally, the present application cross-references commonly owned U.S. Pat. No. 8,045,505 entitled MECHANISM FOR AUTOMATIC NETWORK FORMATION AND MEDIUM ACCESS COORDINATION, which is incorporated herein by reference in its entirety.

COMPUTER PROGRAM LISTING

An Appendix hereto includes the following computer program listing which is incorporated herein by reference: "LEID0046_DMANETWithTSForGPSDeniedEnvs-Code-Appendix.txt" created on Mar. 6, 2024, 91.0 KB.

BACKGROUND

Field of the Embodiments

The present embodiments are directed to an improved process for forming Mobile Adhoc Networks (MANETs).

Description of the Related Art

Conventional MANETs employ omni-directional antennas and very few employ directional antennas, but require a-priori topology awareness and knowledge of participants with cumbersome network resource planning required. While the use of only omni-directional antennas obviates the need for time-synchronization, omni-directional-based MANETs are more susceptible to interference resulting in performance degradations, loss of data, and increased difficulties sustaining connectivity. Conventional omni-based networks also tend to employ contention-based medium access mechanisms that do not require time synchronization (TS) of nodes, but contention-based approaches limit effective bandwidth utilization since as the name indicates, there may be continuous contention for the medium and wasted bandwidth as collisions will occur since communications are not well coordinated among participating nodes. In contention-based Medium Access Control (MAC), random backoff mechanisms are employed which yield wasted bandwidth as nodes sense for collisions and upon detection of another transmitter, a node also wanting to transmit data chooses to execute a "random backoff" whereby the node remains idle (neither transmitting nor receiving) for a period of random duration in hopes its transmission can be retried without contention/collisions at a later time (when the period ends), which isn't guaranteed. As a result, these types of mesh networks experience exponential bandwidth decreases with respect to node count.

Our baseline directional D-MANET (FIG. 1) capability provides a completely self-forming and self-managing high bandwidth, low latency, resilient, and fast-reacting Internet Protocol (IP)-based MANET solution which can be hosted on software defined radio (SDR) terminals to operate with highly directional, narrow-beam RF antennas (e.g., phased arrays) (although it also supports omni-directional antennas) with the inherent interference mitigation benefits of antenna directivity. This mandates that transmission opportunities at one node align in time with reception opportunities at the intended peer for the two nodes to successfully communicate. To ensure that periodic communications between pairs of nodes are successful such that all neighboring nodes are serviced without conflict or collisions with simultaneous communications between different pairs of nodes, the Applicant's existing D-MANET incorporates a novel Time-Division-Multiple Access (TDMA) Medium Access Coordination (MAC) mechanism where steady state communications are efficiently coordinated to eliminate conflict and adapt seamlessly. However, any TDMA-based network requires that all nodes be time-synchronized to join the network and to communicate (i.e., for peer discovery, link formation, and subsequent user-data dissemination data and maintenance of network connectivity).

From a networking perspective, the D-MANET's data delivery approach is innovative in the complementary way in which its fully distributed and autonomous algorithms interact synergistically to adapt critical link and waveform parameters in real-time to optimally utilize available resources (e.g., frequency channels, bandwidth, power, coding, and modulation) and maximize their availability without the need for a-priori knowledge of participants, preplanning, or operator intervention. Furthermore, through high-fidelity modeling and simulation, we have demonstrated our D-MANET to scale to 1000+ nodes, providing high bandwidth, low latency robust and resilient end-to-end data dissemination.

The D-MANET communications outperform conventional rigid MANETs' "best-effort" data delivery modality through elegant algorithms and protocols that result in higher bandwidth, increased link robustness, and sustained network health. The majority of conventional MANETs support only omni-directional (omni) antennas making them more susceptible to jamming and interference and requiring a larger number of nodes to support wide-area coverage, limiting node-count as these types of MANETs cannot scale beyond 100 or 200 nodes.

Global Positioning Systems (GPS) provide immediate time synchronization of nodes even before they attempt to form the network. They also provide position data to facilitate other functions unique to directional networks such as pointing and tracking of peer nodes. Unfortunately, denial and spoofing techniques can be employed to prevent proper use of the network. Access and bandwidth limitations brought on by an increasingly contested and crowded spectrum have escalated the burden of network pre-/re-planning making it unwieldy in large scale. Interference and spectrum contention can result in highly intermittent or extended periods of interrupted communications.

Continuing advancements in sensor, application, and unmanned platform technologies, leading to increasing data volumes and evolving mission scenarios with ever-larger numbers of participants, call for sustained and timely end-to-end dissemination of priority-diverse data across wide geographical areas. Access and bandwidth limitations brought on by an increasingly contested and crowded spectrum have escalated the burden of network pre-/re-planning making it unwieldy in large scale. Interference and malicious A2/ AD (e.g., GPS-denial and jamming) attacks can result in highly intermittent or extended periods of interrupted communications.

In addition, currently deployed hardware-centric and rigid communication systems are unable to scale to the envisioned levels due to long and costly design and development cycles. From a capability perspective, conventional radios are now reaching performance limitations regarding desired latencies, capacity, reliability, scalability and flexibility.

Directional communications support longer ranges, offer inherent interference mitigation benefits, and provide wider coverage with fewer nodes and shorter routes yielding shorter end-to-end latencies. But there are few, if any, efficiently operating directional tactical communication systems. Prior art includes "semi-directional" systems (employ sector antennas), are also considered very expensive and require network management tools often cited as cumbersome and operationally ineffective. Our D-MANET approach is directional and eliminates the need for cumbersome resource management. Being completely cognitive and self-managed, it requires no operator intervention.

Given the need for high capacity and low-latency routing of data, there is a need in the art for cognitive, autonomously adaptive, directional mesh networking techniques that support mobility anywhere and push performance boundaries beyond those of conventional mobile networking systems. The present embodiments target the aforementioned issues, with the goal to enable D-MANET operation in GPS-denied environments without lengthening network formation timelines or requiring a separate time-synchronization process that must complete before nodes even attempt to form a network.

SUMMARY OF THE EMBODIMENTS

The present embodiments target the aforementioned issues, and its goal is to enable D-MANET operation in GPS-denied environments without lengthening network formation timelines or requiring a separate time-synchronization process that must complete before nodes even attempt to form a network. Our D-MANET approach is directional and eliminates the need for cumbersome mission pre-planning or mid-mission re-planning. Being completely cognitive and self-managed, it requires no operator intervention.

In a first exemplary embodiment, a process for linking nodes to form a directional network including multiple, synchronized nodes, includes: wirelessly transmitting by a directional antenna of a first synchronized node a link establishment request; receiving by the directional antenna of the first synchronized node, a link establishment response from a directional antenna of a first unsynchronized node, wherein the first unsynchronized node does not have access to GPS positioning data; and wirelessly transmitting by the directional antenna of the first synchronized node, a link establishment acknowledgement; wherein upon receipt of the link establishment acknowledgement, the first unsynchronized node calculates a clock value to match a clock value of the first synchronized node and establishes a link therewith.

In a second exemplary embodiment, a process for forming a directional network including multiple, synchronized nodes, includes: wirelessly transmitting by at least a first synchronized node a link establishment request at time T1; receiving by the at least a first synchronized node, a link establishment response from at least a first unsynchronized node, the link establishment response including a received time R1 and a transmission time T2, wherein the at least a first unsynchronized node does not have access to GPS positioning data; and wirelessly transmitting by the at least a first synchronized node, a link establishment acknowledgement, the link establishment acknowledgement including a received time R2 and a transmission time T3; wherein upon receipt of the link establishment acknowledgement, the at least a first unsynchronized node calculates a clock value to match a clock value of the at least a first synchronized node and establishes a link therewith.

BRIEF DESCRIPTION OF THE FIGURES

Example embodiments will become more fully understood from the detailed description given herein below and the accompanying drawings, wherein like elements are represented by like reference characters, which are given by way of illustration only and thus are not limitative of the example embodiments herein.

FIGS. 6a, 6b, 6c provide examples of directional reception listening dwells and comparative impact on LE/TS duration in accordance with an embodiment herein;

FIGS. 7a, 7b, 7c provide examples showing the impact of directional receptions on relative bearing knowledge in accordance with an embodiment herein;

DETAILED DESCRIPTION

Figure 1:
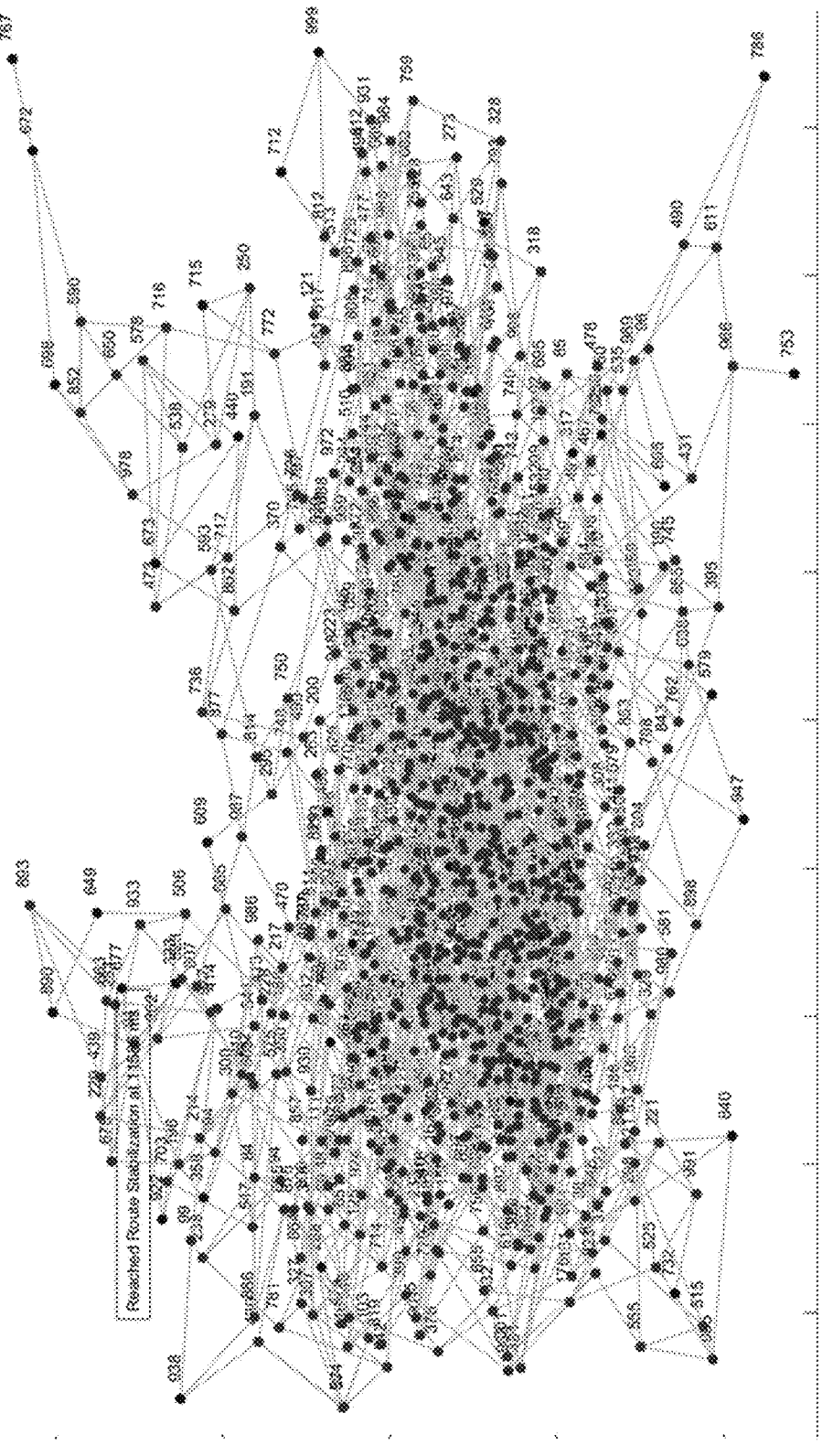
FIG. 1 is an exemplary stabilized _____-node network formed using the prior art D-MANET capability.

The embodiments referenced herein, including the documents attached hereto and incorporated fully herein, describe and support a low-risk and cost-effective system and process that operates on low Size, Weight, Power, and Cost (SWaP-C) Software Defined Radios (SDRs) and employs existing antennas or inexpensive COTS/GOTS surrogates, to offer the reprogrammable flexibility for future capability enhancement and eliminate the long and expensive effort of stove-piped hardware modification or redesign. The embodiments enable drastic latency improvements over most, if not all, currently deployed systems, which is essential in taking swift action against fast incoming threats at large scale. A more detailed description of various key aspects of the embodiments are discussed below.

As described herein, the present embodiments enhance the Assignee's baseline D-MANET's directional peer discovery, link establishment, and link maintenance algorithms to do away with reliance on GPS for time-synchronization and peer tracking. For Directional operation, we identify several algorithm enhancements that allow nodes to synchronize and form links simultaneously and employ antenna pattern manipulations (dithering) to assist peer tracking and antenna pointing. The embodiments leverage available GPS signaling, but do not rely on it.

A fast directional Time Synchronization (TS) approach during peer-discovery enables link establishment (LE) with TS handshakes simultaneously so that a directional network is quickly formed by nodes that may be initially completely unsynchronized in time. In essence, synchronization information to enable synchronization augments the directional link establishment handshakes being carried out by synchronized nodes to assist previously unsynchronized nodes to synchronize and also form links in the process, such that TS and LE occur simultaneously without requiring separate or time-consuming modes; We then continue periodic TS exchanges in steady state to maintain synchronization and overcome disparate clock reference drift.

For the continued description below, it is assumed that each node has an on-site North Reference, i.e., every node has knowledge of true North from an on-site magnetometer, compass, or similar system, and an on-site clock/oscillator for its local time reference of high-accuracy/slow-drift. Non-limiting examples for an on-site clock are listed below: Basic crystal oscillator Accuracy (Worst): (+100E-6); worst case 200E-6 "secs/sec" relative drift; TCXO—temperature-controlled oscillator Accuracy: (+5E-6), incurring a worst case 10E-6 "secs/sec" relative drift; OCXO—Oven-controlled oscillator Accuracy: (+5E-10) incurring a worst case 10E-6 "secs/sec" relative drift; Rubidium standard Accuracy: (+1E-12) incurring a worst case 2E-12 "secs/sec" relative drift; and Cesium standard Accuracy (best): (+1E-13), worst case 2E-13 "secs/sec" relative drift.

The key functional elements of the embodiments include 1) a short three-way Link Establishment (LE) handshake which executes to form a link and assist unsynchronized nodes to simultaneously achieve Time Synchronization (TS) and join the network, and 2) a peer discovery scan pattern that employs directional Transmissions (Tx) and receptions (Rx) and ensures repeated and continuing opportunities for two nodes within range to point toward each other to execute the LE/TS handshake. The functional elements are discussed in detailed below.

Figure 2:
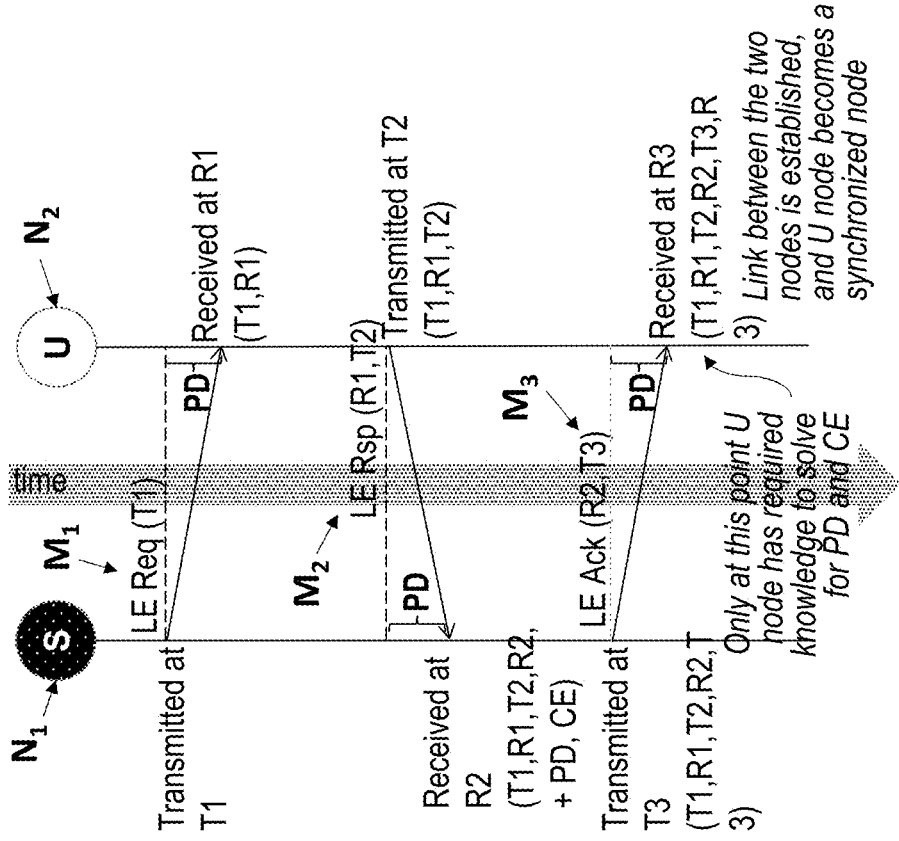
FIG. 2 is an exemplary link establishment (LE) handshake sequence in accordance with an embodiment herein.

Messages of the LE handshake include pertinent information to ensure the successful exchange of the subsequent message in the handshake. Because each message is carefully coordinated with respect to pointing direction, transmission/reception operation, and message type/content, once the first message is received, there is a high probability that the full three-way LE/TS handshake will complete between the two nodes, $N_1$ and $N_2$. The handshake consists of three messages: LE Request (LE Req) $M_1$, LE Response (LE Rsp) $M_2$, and LE Acknowledgement (LE Ack) $M_3$. The handshake, augmented with time synchronization (TS) information in the message content, proceeds as depicted in FIG. 2, wherein for LE Req $M_1$ a TS assistant (synchronized node) node $N_1$ sends an LE Req including time T1. The node $N_2$ receiving the LE Req $M_1$ assumes responder role and records reception time R1 and T1; then transmits LE Rsp $M_2$ including time of transmission T2 and R1. The TS assistant node $N_1$ receives LE Rsp $M_2$ and records the time LE Rsp $M_2$ is received (R2) and transmits LE Ack $M_3$ including LE Rsp $M_2$ reception time R2 and LE Ack $M_3$ transmission time T3. An unsynchronized node $N_2$ that receives LE Ack and records R3, R2 and T3 can compute clock error (CE) and propagation delay (PD) as follows:

$$R1 - T1 = PD + CE \tag{1}$$

$$R2 - T2 + PD - CE \tag{2}$$

From Eq. (1):

$$PD = (R1 - T1) - (CE) \tag{3}$$

From Eq. (2):

$$PD = (R2 - T2) + CE \tag{4}$$

Combining Eqs. (3) and (4) provides the propagation delay (PD), wherein $$PD = [(R1 - T1) + (R2 - T2)]/2 \tag{5}$$

Re-writing Eq. (1):

$$CE = (R1 - T1) - PD \tag{6}$$

And re-writing Eq. (2):

$$CE = -(R2 - T2) + PD \tag{7}$$

Combining Eqs. (6) and (7) provides clock error (CE):

$$CE = [(R1 - T1) - (R2 - T2)]/2 \tag{8}$$

T2, R2, and T3, R3 can be used to verify/refine PD and CE. The unsynchronized node $N_2$ sets its clock to match TS assistant's $N_1$ clock thus becoming synchronized, thus becoming an assistant node to other unsynchronized nodes.

Improbable conditions preventing the successful completion of the handshake include "beam-on-beam" interference from a third transmitting node. This condition is improbable because it would require that a third node be transmitting in the exact same beam and direction of the transmitter, using the same frequency channel (the present embodiments use frequency hopping), and be in sufficient proximity to interfere. A node could also withhold the LE Req or LE Rsp transmission if it has already reached the configured maximum number of neighbors; or the state of ongoing LE handshakes with other peers, present extremely rare conflicts when selecting an LE Ack reception opportunity before sending the LE Rsp. The algorithm of the present embodiments carefully imposes a set of rules such that these conditions are extremely rare, and by virtue of it being a continuous process, additional future opportunities are assured to re-try link establishments with peers that don't initially succeed. These improbable conditions are also unlikely to persist from one attempt to the next.

Figure 3:
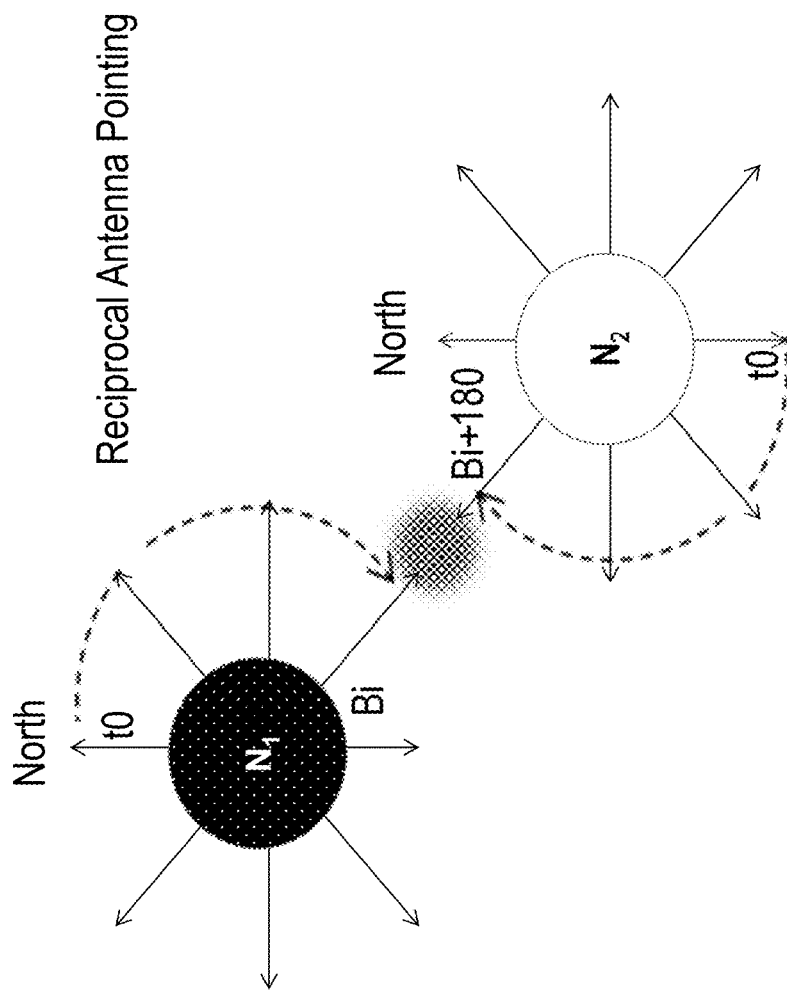
FIG. 3 illustrates the reciprocal antenna pointing required to kick off an handshake sequence in accordance with an embodiment herein.

The peer discovery scan pattern employs a "sub-template-based" approach that ensures continuous opportunities are provided for completion of the handshake between any two nodes within range. FIG. 3 depicts that for two nodes, $N_1$ and $N_2$, to discover each other requires that one node $N_1$ (or $N_2$) sends the first message in the handshake in the direction Bi and at the time t0 that the peer node $N_2$ (or $N_1$) is within proximity, has chosen to receive the first message in the handshake, and is pointing in the reciprocal direction Bi+180. It should be noted that this depiction holds true for latitudes near the Equator. A bearing adjustment mechanism can be used to ensure peer-to-peer reciprocity as nodes' position near the poles.

Figure 4:
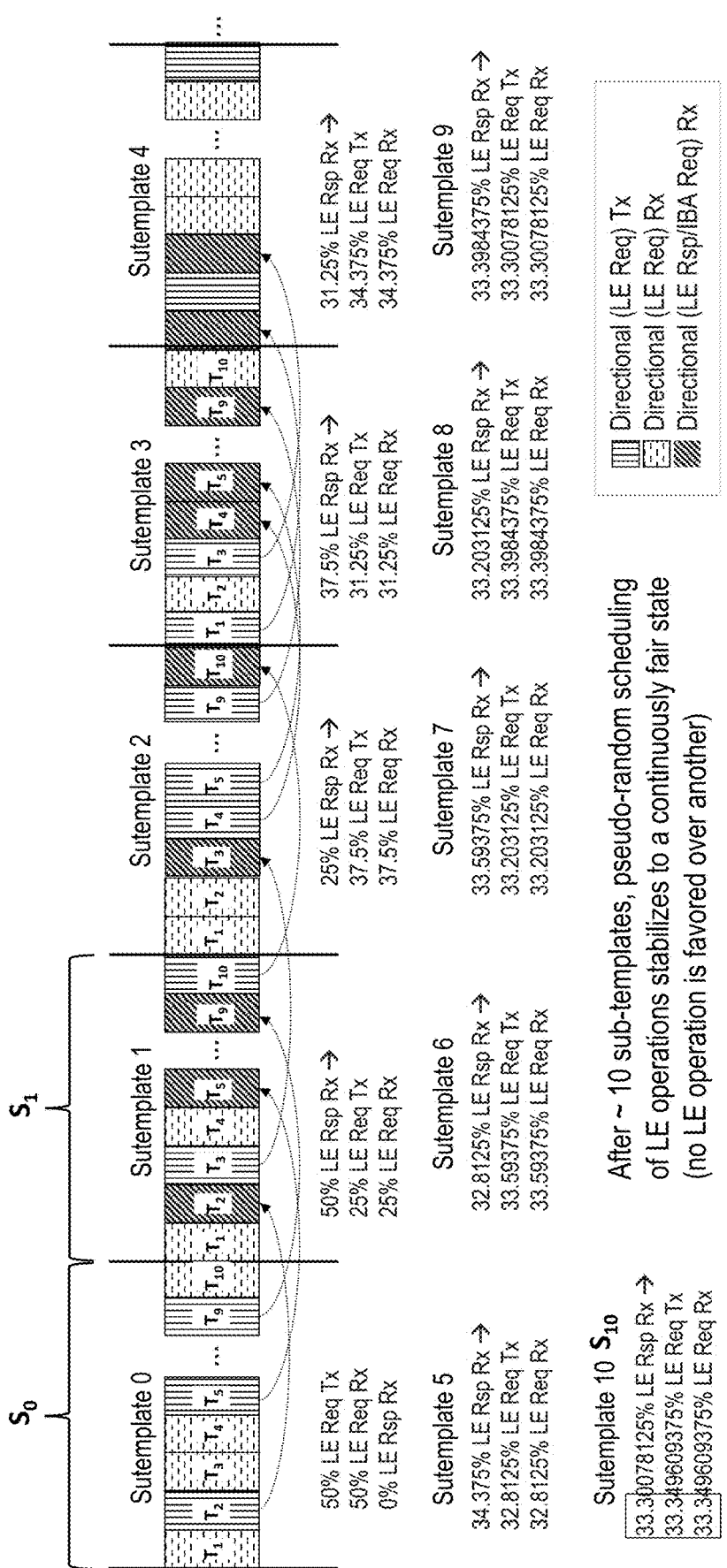
FIG. 4 is an exemplary Pseudo-randomized discovery scan pattern scheduling for LE in accordance with an embodiment herein.

A pseudo-randomized discovery scan pattern scheduling for link establishment, e.g., sub-template approach, is depicted in the example of FIG. 4. FIG. 4 depicts the LE/TS process using solely directional antennas throughout the handshake. Nodes independently schedule their sub-template St by pseudo-randomly selecting whether to transmit (Tx) an LE Req or receive (Rx) an LE Req for the very first sub-template $S_0$ wherein i=0 (Sutemplate 0) since being powered ON. For the next sub-template, Sutemplate 1 $S_1$, and subsequently, while the node is operational, all timeslot indices $T_j$ in sub-template i for timeslots scheduled to transmit LE Req messages, are scheduled as LE Rsp receptions in the subsequent sub-template i+1. This way a responder can schedule its LE Rsp transmission on the same timeslot index in which it received the LE Req so that it is assured that the LE Req sender is pointing in its direction at that time and the LE Req identifies that response timeslot in the subsequent sub-template. All remaining timeslots of sub-template i+1 are again scheduled randomly as either LE Req Tx or LE Req Rx timeslots.

As we see in FIG. 4, for $S_0$, timeslots $T_2$, $T_5$ and $T_9$ are pseudo-randomly selected to transmit (Tx) a LE Req, which means that for $S_1$, timeslots $T_2$, $T_5$ and $T_9$ are selected to receive (Rx) an LE Req. Similarly, for $S_1$, timeslots $T_3$ and $T_{10}$ are pseudo-randomly selected to transmit (Tx) an LE Req, which means that for $S_2$, timeslots $T_3$ and $T_{10}$ are selected to receive (Rx) an LE Req and so forth until the pseudo-random scheduling of LE operations stabilizes to a continuously fair state, i.e., no LE operation is favored over another. Under the sub-templates in FIG. 4, we can see the effect of this continuing scheduling pattern to the distribution of randomly selected operations (Tx/Rx) and message types and prove that after approximately 10 sub-template $S_{10}$ (Sutemplate 10), it converges to a fair distribution of 33% LE Req Tx, 33% LE Req Rx, and 33.3% LE Rsp Rx. Depending on the configured sub-template size, this may amount to only a couple of seconds from power-up before the distribution stabilizes and the sub-template size also dictates how long a link takes to form from the time the LE Req is successfully received.

Figure 5:
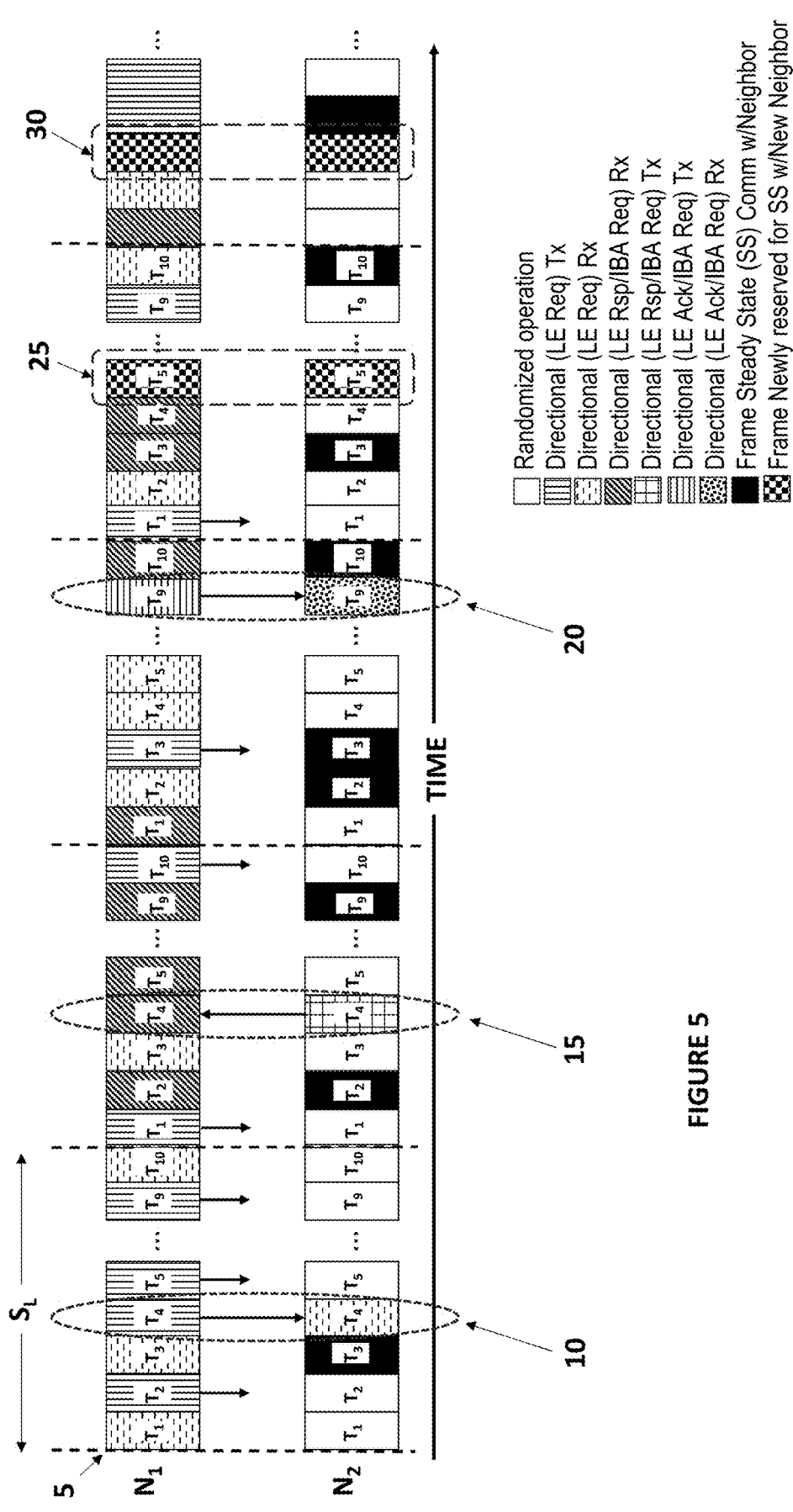
FIG. 5 is an exemplary time-lapsed progression of LE handshake between two nodes in accordance with an embodiment herein.

The LE handshake also piggybacks a two-way handshake for coordinating steady state communications scheduling (already part of the baseline D-MANET capability) such that upon forming the links, the two nodes will have also coordinated the steady state TDMA-based communication pattern. This pattern persists while the link is maintained. These same steady state timeslots are unreserved and returned to the pool of timeslots during which to continue to search for peers and conduct LE handshakes when links are dropped. The D-MANET algorithm monitors existing links to determine if a link has become unsustainable and both nodes thus gracefully drop the link. During the now unreserved opportunities, nodes continue to execute the pseudo-random sub-template-based LE operations of the discovery and LE scan (see FIG. 4). An exemplary snapshot of a time lapsed progression of the LE handshake process between two nodes is depicted in FIG. 5. Node 1 ($N_1$) is powered ON 5 and is joining the networks having established no links yet, and Node 2 ($N_2$) is a node already in a network with links already established with other peers (neighbors). At points 10 and 20, $N_2$ hears $N_1$. At point 15, $N_1$ hears $N_2$'s idle frame/slot. Points 25 and 30 indicate newly reserved time frames/slots with new neighbors.

To ensure we don't impact the D-MANET's interference mitigation performance, and that we don't drastically extend the time it takes for nodes to form a link and synchronize, an omni antenna is employed only for LE receptions and directional antennas are employed for all LE transmissions and any receptions after peer nodes have sufficient knowledge to properly point at each other. Specifically, for peer discovery, where the pointing directions are determined as a function of time (albeit local and potentially unsynchronized time) we incorporate omni-based receptions while using the most robust (higher error correction capability and potentially lower bandwidth) waveform to make "first contact", noting that LE messages, now updated with time synchronization information, are relatively small. Using a robust waveform also helps overcome the range deficit incurred from using the lower gain omni.

There are two essential problems that arise with the lack of synchronization in a strictly directional MANET implementation. With healthy GPS signaling, nodes can establish links in a fully directional manner. With accurate synchronized time, they can reciprocally align the pointing directions for discovery as a function of time to ensure any two nodes within range have continuously reoccurring opportunities to execute the LE handshake. With accurate position data which can be exchanged between nodes, nodes can also readily track their peers and point toward them on every communication opportunity as they can exchange GPS position and rate of motion data. We list two major issues that we had to resolve and describe the algorithmic approach to resolve them.

Directional "listening" (reception) dwells for receiving the first message in the handshake could ensure that first contact, but could also drastically extend the time it takes for two nodes to achieve synchronization and link formation, and thereby the create unacceptable delays in network formation timelines from just 10s of seconds to minutes or 10s of minutes depending on the narrowest beamwidth (the narrower the beamwidth, the more bearings that must be visited to cover all 360 degrees of a peer discovery scan) and network size. To make matters worse, without accurate position and time, during these dwells, nodes could be receiving side-lobe transmissions on a main-lobe or main-lobe transmissions on a side-lobe, or side-lobe transmissions on a side-lobe. Every case can result in one or both nodes having the wrong sense of relative bearings toward each other.

Without GPS however, unsynchronized nodes would point at different positions in time that would never align reciprocally. For this reason, if using strictly directional communications for the LE handshake (augmented with TS information), unsynchronized nodes would have to conduct reception dwells at every bearing to ensure there will be an opportunity during which a synchronized transmitter will be able to point directly at them. The duration of each dwell depends on the number of bearings that need to be visited by a synchronized transmitter during the scan which is a function of the narrowest beam antenna in the network. Because the choice of transmitting or receiving LE Req messages during the peer discovery scan is a pseudo-random choice each node makes at each timeslot, resulting in nodes only transmitting LE Req a third of the time, to visit n bearings, it takes 3*n timeslots to make a 360-degree revolution of LE Req transmissions at every bearing. As shown in FIG. 6, to receive just one of those LE Req messages, an unsynchronized receiver node would have to dwell at each of the n bearings for the duration of a transmitter's 360-degree scan before moving onto the next bearing.

Due to the lack of synchronization, the worst-case delay is incurred when the unsynchronized node's first listening dwell direction is for the bearing just after the transmitter was pointing in the unsynchronized node's direction. Thus, the unsynchronized node could have to go through n dwells to hit each bearing, for the duration of 3*n per dwell, before hearing the synchronized node again, so the worst-case incurred delay to even hear the first message in the hand-shake (an LE Req) could be as high as 3*n*n*timeslot_duration.

FIGS. 6a and 6b show exemplary synchronized node to unsynchronized node cases for directional antennas nodes (narrow (FIG. 6a) and wide (FIG. 6b) antenna beam). FIG. 6a shows an example scenario where the required number of individual bearings is n=60 and the timeslot duration is 5 ms (configurable), while in FIG. 6b, the example assumes a 2× wider beamwidth, and thus only n=30 bearings are to be visited. Using the same timeslot duration of 5 ms, the narrower beam antenna case (FIG. 6a) could incur a worst-case delay of almost 1 minute for an unsynchronized node to hear a synchronized node's LE Req message. For the 30-bearing case, this drops to 13.5 seconds. If there are other conditions that prevent any of the messages in the handshake from being successfully received, there will be additional opportunities, but may incur similar delays for subsequent attempts at the handshake, so link establishment and time synchronization between two nodes could take on the order of minutes. Directional listening dwells can incur drastic delays in the timeline for LE and TS completion, whereas with healthy GPS signaling, the worst-case delay would be just 3*n*timeslot_duration, which using n=30, and the same timeslot duration, would be only 0.45 seconds for a node to hear an LE Req from a peer since both nodes are already synchronized.

As the invention aims to remove reliance on GPS and eliminate the need to incorporate directional Rx dwells by unsynchronized nodes just to hear an LE Req and overcome the inherent delay penalty of directional Rx dwells, we adapted this approach to have unsynchronized nodes execute continuous omni-directional receptions instead of the pseu-dorandomized transmission/reception operations. FIG. 6c shows an equivalent 30-bearing case wherein the receiving node antenna is omni-directional. At the same time slot duration of 5 ms, the delay drops significantly to 0.15 seconds. Since LE messages are inherently small, we can leverage the most robust waveform (highest error correction overhead, which helps extend range) to transmit and receive the LE Req. We can use a fixed frequency channel for this first message, base the channel selection for subsequent messages on information that is progressively learned from prior messages (node ID of TS assistant, the exchanged time information, etc.). Alternatively, we can carry the frequency-hopped channel index within the preamble of the transmis-sion timeslot to indicate to a potential receiver what fre-quency channel to use for the remainder of the reception, thus retaining interference mitigation robustness of the base-line D-MANET approach.

With GPS, nodes can readily point their main-lob beams toward each other at the right time. This is not feasible if nodes operate based on unsynchronized time references as they would point in completely mis-aligned directions. Although the LE/TS handshake may complete in some cases, nodes may infer that their new neighbor is in a position derived from the perceived bearing at which they heard each other. FIGS. 7a, 7b, 7c highlight cases of potential issues regarding relative position/direction knowl-edge when side-lobe transmissions and receptions are involved, all of which result in either or both nodes having a mistaken sense of the direction (indicated by the faded portions of the diagrams) to point toward the other, which may impact the ability to subsequently sustain the link in steady state.

Figures 8A, 8B, 8C, 8D:
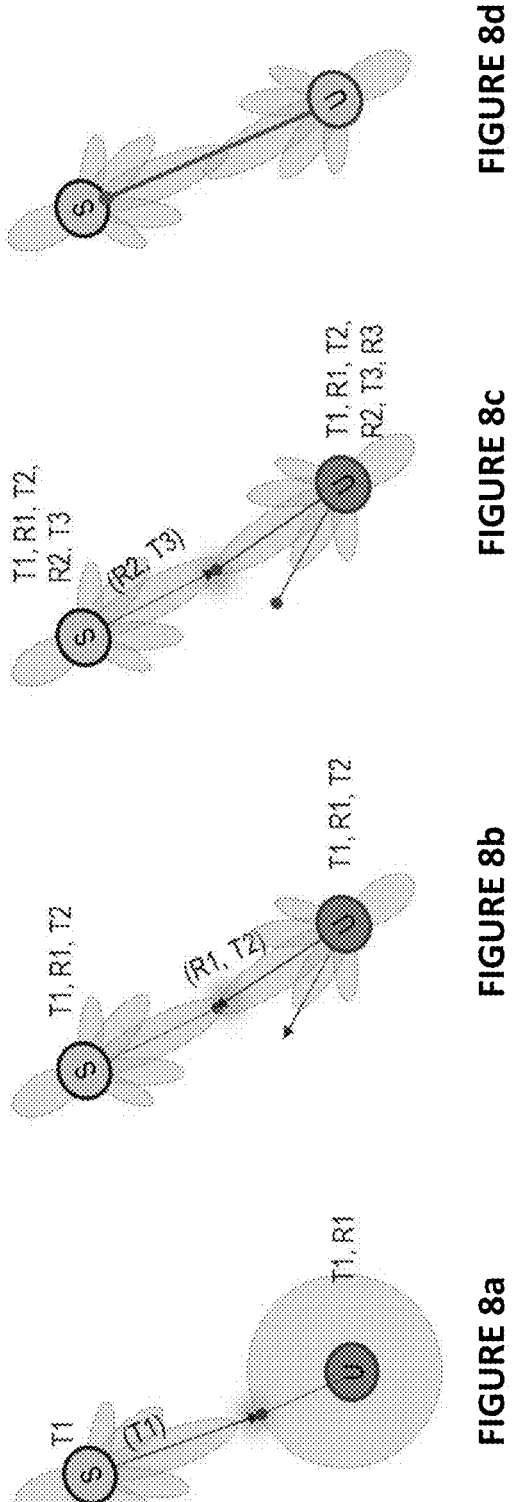
FIGS. 8a, 8b, 8c, 8d provide examples showing the impact of omni reception on relative bearing knowledge in accordance with an embodiment herein.

Algorithm Enhancement: In addition to the described listening dwell induced issues, side-lobe induced issues are also overcome by using omni-directional receptions for the first message of the handshake. This is illustrated in FIGS. 8a, 8b, 8c and 8d. In FIG. 8a, node S uses the most robust waveform to send LE Req, overcoming range deficit from lower-gain omni reception at U. The message is small, so low bandwidth is ok. Node U listens on the omni antenna and hears the LE Req with TS info from S' main lobe. Node U used T1 to know S' LE Req main-lobe Tx bearing. In FIG. 8b, Node U adjusts its LE Rsp Tx bearing to the reciprocal of S' LE Req Tx bearing and the handshake will very likely succeed since pointing is most ideal now. Node U used clock delta d=(Ts−Tu) to know the timing of the directional LE Rsp transmission, but doesn't adjust its clock until it com-pletes the three-way handshake. LE Rsp identifies LE/TS Ack frame of day (in S's time-reference). In FIG. 8c, at the timeslot identified in the LE Rsp, S sends and U receives LE Ack. Node U records R3, makes clock adjustment based on computed clock error, and prop-delay; estimates range as function of prop-Delay and speed of light. If handshake fails, i.e., no LE Ack is received, U can do a coarse adjustment of its clock to the frame resolution based on clock delta to S to get closer to S nodes as it listed to subsequent LE attempts. Node U continues to listen on the omni and does not need to conduct listening dwells. And in FIG. 8d, once synchronized, the link is established. For peer tracking on board sensors (outside of GPS) and antenna pattern manipulation enable peer tracking between con-nected nodes as they communicate in steady state. Now synchronized, node U uses the bearing prescribed by the LE/Discover scan pattern to assist other unsynchronized nodes to synchronize and join the network.

Using an omnidirectional LE Req reception, but direc-tional transmissions during the LE handshake, also obviates potential errors in nodes' eventual assumptions regarding their knowledge of relative pointing direction toward their neighbors if the LE handshake were strictly directional due to the potential side-lobe transmissions and/or receptions. FIGS. 8a, 8b, 8c and 8d describe adaptations to the algo-rithms which resolve this issue.

Through modeling and simulation of the invented algo-rithms we proved Expedited TS with Directional Tx, omni-directional receptions to eliminate need for listening dwells at each bearing during link formation and to eliminate potential relative bearing errors. We demonstrated scalabil-ity and fast time synchronization speed for link/network formation and synchronization completion time) in large network scenarios of 50, 200, and 500 nodes.

Figure 9:
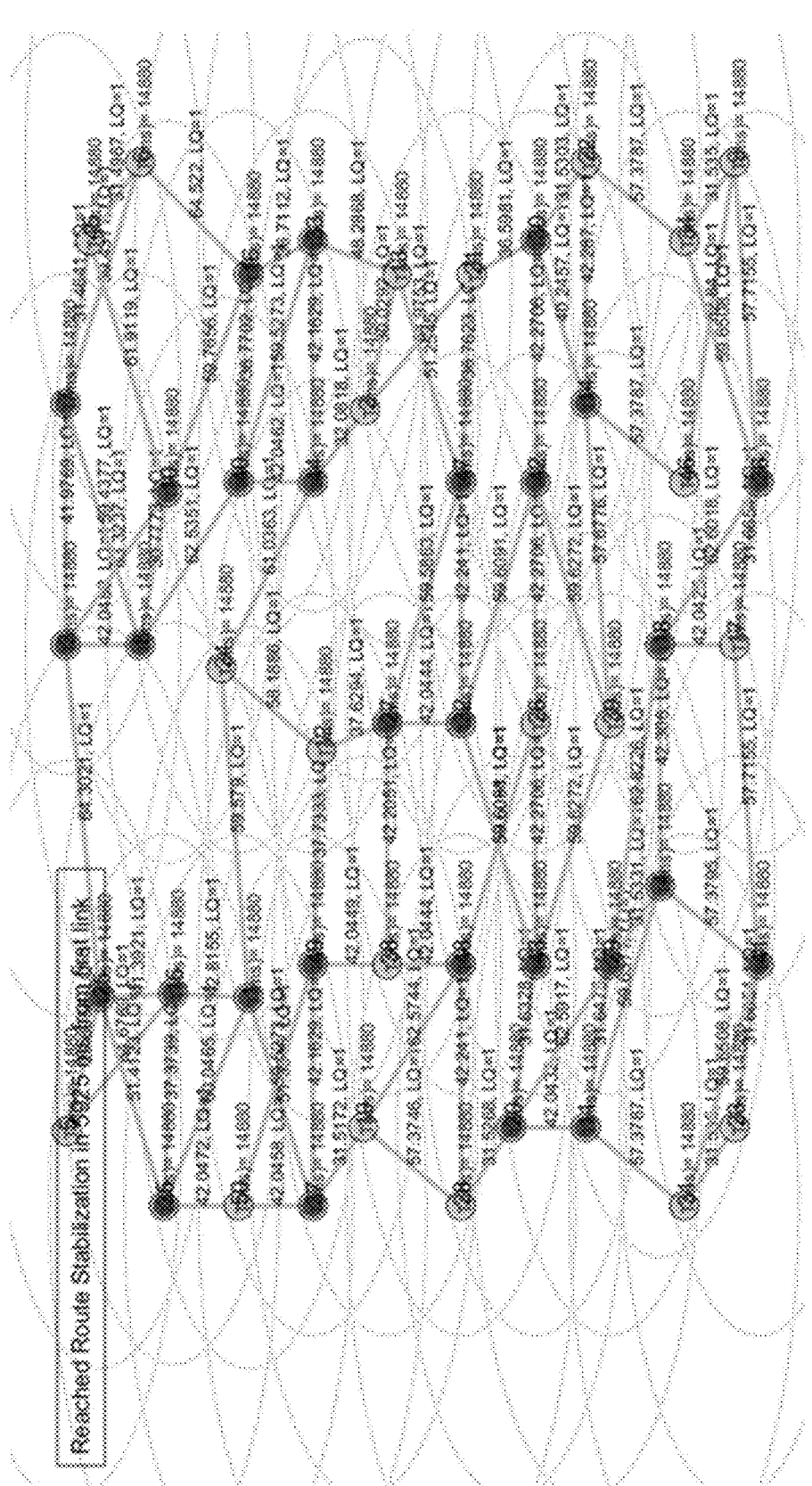
FIG. 9 is an exemplary stabilized 50-node network formed using the prior art D-MANET capability.

FIG. 9 shows a group of 50 nodes, initially completely unsynchronized (all nodes have a different randomly initial-ized time reference), completing time synchronization (TS) in under 7 seconds (6.12 seconds). Route convergence was achieved at 5.925 seconds (from every node to every other node). The average worst case end-to-end (E2E) latency=21.7114 ms per hop.

Table 1 depicts results with larger network scenarios (200 and 500 nodes), both of which prove the efficiency of the embodied process, as even very large networks, starting with every node completely asynchronized (starting out with a random time), are able to complete synchronization and network formation in just seconds (12 and 18.6 seconds respectively).

TABLE 1

| Network Scenario (node count) | Time Synchronization Duration | Route Convergence Timeline |
|---|---|---|
| 50 nodes | 6.1 seconds | 5.9 seconds |
| 200 nodes | 11.7 seconds | 12.0 seconds |
| 500 nodes | 18.3 seconds | 18.6 seconds |

While the aspects described herein have been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary aspects and embodiments, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims.

I claim:

1. A process for linking nodes to form a directional network including multiple, synchronized nodes, the process comprising:

wirelessly transmitting by a directional antenna of a first synchronized node a link establishment request;

receiving by the directional antenna of the first synchronized node, a link establishment response from a directional antenna of a first unsynchronized node, wherein the first unsynchronized node does not have access to GPS positioning data; and wirelessly transmitting by the directional antenna of the first synchronized node, a link establishment acknowledgement;

wherein upon receipt of the link establishment acknowledgement, the first unsynchronized node calculates a clock value to match a clock value of the first synchronized node and establishes a link therewith.

2. The process according to claim 1, wherein the first synchronized node implements a pseudo-randomized discovery scan pattern for establishing links with other nodes.

3. The process according to claim 2, wherein the pseudo-randomized discovery scan pattern is implemented by the first synchronized node using a series of ordered sub-templates, wherein each sub-template includes a predetermined number of ordered time slots.

4. The process according to claim 3, wherein, responsive to being powered on, pseudo-randomly designating, by the first synchronized node, one or more time slots in a first sub-template to either transmit or receive a link establishment request; and for the time slots designated in the first sub-template to transmit a link establishment request, designating this same time slot in later sub-templates to receive a link establishment request response.

5. The process according to claim 4, wherein the link establishment request transmitted by the first synchronized node includes an indication of timeslot location within a sub-template, and further wherein the link establishment response from the first unsynchronized node is transmitted at this time slot location.

6. The process according to claim 1, wherein upon establishing a link with the first synchronized node, the first unsynchronized node becomes a second synchronized node, the second synchronized node wirelessly transmitting a link establishment request in a pseudo-randomly designated time slot within a first sub-template;

receiving by the second synchronized node, a link establishment response from a second unsynchronized node on the same designated time slot, wherein the second unsynchronized node does not have access to GPS positioning data; and wirelessly transmitting by the second synchronized node on the same designated time slot, a link establishment acknowledgement;

wherein upon receipt of the link establishment acknowledgement, the second unsynchronized node calculates a clock value to match a clock value of the second synchronized node and establishes a link therewith.

7. A process for forming a directional network including multiple, synchronized nodes, the process comprising:

wirelessly transmitting by at least a first synchronized node a link establishment request at time T1;

receiving by the at least a first synchronized node, a link establishment response from at least a first unsynchronized node, the link establishment response including a received time R1 and a transmission time T2, wherein the at least a first unsynchronized node does not have access to GPS positioning data; and wirelessly transmitting by the at least a first synchronized node, a link establishment acknowledgement, the link establishment acknowledgement including a received time R2 and a transmission time T3;

wherein upon receipt of the link establishment acknowledgement, the at least a first unsynchronized node calculates a clock value to match a clock value of the at least a first synchronized node and establishes a link therewith.

8. The process according to claim 7, wherein the at least a first synchronized node wirelessly transmits using a directional antenna.

9. The process according to claim 7, wherein the at least a first unsynchronized node wirelessly receives using a directional antenna.

10. The process according to claim 7, wherein the at least a first synchronized node implements a pseudo-randomized discovery scan pattern for establishing links with other nodes.

11. The process according to claim 10, wherein the pseudo-randomized discovery scan pattern is implemented by the at least a first synchronized node using a series of ordered sub-templates, wherein each sub-template includes a predetermined number of ordered time slots.

12. The process according to claim 11, wherein, responsive to being powered on, pseudo-randomly designating, by the at least a first synchronized node, one or more time slots in a first sub-template to either transmit or receive a link establishment request; and for the time slots designated in the first sub-template to transmit a link establishment request, designating this same time slot in later sub-template to receive a link establishment request response.

13. The process according to claim 12, wherein the link establishment request transmitted by the at least a first synchronized node includes an indication of timeslot location within a sub-template, and further wherein the link establishment response from the at least a first unsynchronized node is transmitted at this time slot location.

14. The process according to claim 7, wherein upon establishing a link with the first synchronized node, the first unsynchronized node becomes a second synchronized node, the second synchronized node wirelessly transmitting a link establishment request in a pseudo-randomly designated time slot within a first sub-template;

receiving by the second synchronized node, a link establishment response from a second unsynchronized node on the same designated time slot, wherein the second unsynchronized node does not have access to GPS positioning data; and wirelessly transmitting by the second synchronized node on the same designated time slot, a link establishment acknowledgement;

wherein upon receipt of the link establishment acknowledgement, the second unsynchronized node calculates a clock value to match a clock value of the second synchronized node and establishes a link therewith.

\*    \*    \*    \*    \*